United States Patent
Li

(10) Patent No.: US 11,301,303 B2
(45) Date of Patent: Apr. 12, 2022

(54) RESOURCE POOL PROCESSING TO DETERMINE TO CREATE NEW VIRTUAL RESOURCE POOLS AND STORAGE DEVICES BASED ON CURREBT POOLS AND DEVICES NOT MEETING SLA REQUIREMENTS

(71) Applicant: Huawei Technologies Co., Ltd., Shenzhen (CN)

(72) Inventor: Songtao Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 16/287,502

(22) Filed: Feb. 27, 2019

(65) Prior Publication Data
US 2019/0196878 A1    Jun. 27, 2019

Related U.S. Application Data

(63) Continuation of application No. PCT/CN2017/075486, filed on Mar. 2, 2017.

(30) Foreign Application Priority Data

Aug. 31, 2016   (CN) .......................... 201610794216.9

(51) Int. Cl.
*G06F 9/50*     (2006.01)
*H04L 12/24*    (2006.01)
(Continued)

(52) U.S. Cl.
CPC ........ *G06F 9/5077* (2013.01); *G06F 9/45558* (2013.01); *G06F 9/5044* (2013.01);
(Continued)

(58) Field of Classification Search
CPC .. G06F 9/5077; G06F 9/45558; G06F 9/5044; G06F 2009/45595; H04L 41/0806;
(Continued)

(56) References Cited

U.S. PATENT DOCUMENTS 7,600,007 B1 * 10/2009 Lewis ................... G06Q 10/04
                                                   709/223
7,856,499 B2 * 12/2010 Robinson ............... G06Q 10/06
                                                   709/226
(Continued)

FOREIGN PATENT DOCUMENTS

CN     103533086 A    1/2014
CN     104348881 A    2/2015
(Continued)

OTHER PUBLICATIONS

Carsten, F., et al., "Autonomic Provisioning of Hosted Applications with Level of Isolation Terms," XP031242903, Fifth IEEE Workshop on Engineering of Autonomic and Autonomous Systems, Mar. 31, 2008, pp. 131-142.
(Continued)

Primary Examiner — Michael W Ayers
(74) Attorney, Agent, or Firm — Conley Rose, P.C.

(57) ABSTRACT

A resource pool processing method and apparatus, and a device, where the method includes obtaining a service template of a to-be-provisioned service, determining, based on the service template, first service-level agreement (SLA) information corresponding to the to-be-provisioned service, determining whether there is SLA information matching the service template on a management server, creating a new storage device based on the first SLA information and preset storage infrastructure when there is no SLA information matching the service template on the management server, creating a new virtual resource pool based on the new storage device, and associating the new virtual resource pool
(Continued)

with a new SLA. Thereby, even when a physical pool occupied by another virtual pool on the management server is damaged, data running of the to-be-provisioned service is not affected, and data isolation is greatly improved.

20 Claims, 10 Drawing Sheets

(51) Int. Cl.
| | |
|---|---|
| *G06F 9/455* | (2018.01) |
| *H04L 41/0806* | (2022.01) |
| *H04L 41/5003* | (2022.01) |
| *H04L 41/5019* | (2022.01) |
| *H04L 41/5041* | (2022.01) |
| *H04L 41/5054* | (2022.01) |

(52) U.S. Cl.
CPC ...... *H04L 41/0806* (2013.01); *H04L 41/5003* (2013.01); *G06F 2009/45595* (2013.01); *H04L 41/5019* (2013.01); *H04L 41/5048* (2013.01); *H04L 41/5054* (2013.01)

(58) Field of Classification Search
CPC ............. H04L 41/5003; H04L 41/5019; H04L 41/5048; H04L 41/5054
See application file for complete search history.

(56) References Cited

U.S. PATENT DOCUMENTS

| | | | | |
|---|---|---|---|---|
| 8,898,402 | B1* | 11/2014 | Strange | G06F 3/0665 |
| | | | | 711/154 |
| 9,292,350 | B1 | 3/2016 | Pendharkar et al. | |
| 10,241,712 | B1* | 3/2019 | Elliott, IV | G06F 3/067 |
| 10,318,896 | B1* | 6/2019 | Sarkar | G06Q 10/0631 |
| 2009/0119664 | A1* | 5/2009 | Pike | G06F 9/45558 |
| | | | | 718/1 |
| 2010/0235832 | A1* | 9/2010 | Rajagopal | G06F 3/0631 |
| | | | | 718/1 |
| 2012/0191929 | A1* | 7/2012 | Zietzke | G06F 9/5072 |
| | | | | 711/162 |
| 2014/0025909 | A1* | 1/2014 | Naor | G06F 3/067 |
| | | | | 711/162 |
| 2014/0201425 | A1* | 7/2014 | Clark | G06F 3/061 |
| | | | | 711/103 |
| 2015/0006665 | A1 | 1/2015 | Krishnamurthy et al. | |
| 2016/0162312 | A1 | 6/2016 | Doherty et al. | |
| 2016/0306581 | A1* | 10/2016 | Belgaied | G06F 3/0644 |
| 2017/0199694 | A1* | 7/2017 | Khemani | G06F 3/0644 |
| 2017/0269868 | A1* | 9/2017 | Yoshida | G06F 3/061 |
| 2017/0324813 | A1* | 11/2017 | Jain | G06F 9/5016 |

FOREIGN PATENT DOCUMENTS

| | | |
|---|---|---|
| CN | 104657215 A | 5/2015 |
| CN | 105224392 A | 1/2016 |
| CN | 105577675 A | 5/2016 |
| CN | 106385329 A | 2/2017 |
| EP | 2109042 A1 | 10/2009 |

OTHER PUBLICATIONS

Foreign Communication From a Counterpart Application, European Application No. 17844835.3, Extended European Search Report dated May 24, 2019, 9 pages.
Machine Translation and Abstract of Chinese Publication No. CN104657215, May 27, 2015, 33 pages.
Machine Translation and Abstract of Chinese Publication No. CN105224392, Jan. 6, 2016, 26 pages.
Foreign Communication From a Counterpart Application, Chinese Application No. 201610794216.9, Chinese Office Action dated Mar. 1, 2019, 5 pages.
Machine Translation and Abstract of Chinese Publication No. CN103533086, Jan. 22, 2014, 13 pages.
Machine Translation and Abstract of Chinese Publication No. CN104348881, Feb. 11, 2015, 15 pages.
Machine Translation and Abstract of Chinese Publication No. CN105577675, May 11, 2016, 19 pages.
Machine Translation and Abstract of Chinese Publication No. CN106385329, Feb. 8, 2017, 37 pages.
Foreign Communication From a Counterpart Application, PCT Application No. PCT/CN2017/075486, English Translation of International Search Report dated May 24, 2017, 2 pages.
Foreign Communication From a Counterpart Application, PCT Application No. PCT/CN2017/075486, English Translation of Written Opinion dated May 24, 2017, 6 pages.

* cited by examiner

RESOURCE POOL PROCESSING TO DETERMINE TO CREATE NEW VIRTUAL RESOURCE POOLS AND STORAGE DEVICES BASED ON CURREBT POOLS AND DEVICES NOT MEETING SLA REQUIREMENTS

CROSS-REFERENCE TO RELATED APPLICATIONS

This application is a continuation of International Patent Application No. PCT/CN2017/075486 filed on Mar. 2, 2017, which claims priority to Chinese Patent Application No. 201610794216.9 filed on Aug. 31, 2016. The disclosures of the aforementioned applications are hereby incorporated by reference in their entireties.

TECHNICAL FIELD

Embodiments of the present disclosure relate to computer technologies, and in particular, to a resource pool processing method and apparatus, and a device.

BACKGROUND

In a cloudification scenario, during creation of a virtual resource pool (virtual pool for short), an administrator creates one or more physical pools on a storage device, and then connects the storage device to a cloud platform. The cloud platform creates a plurality of virtual pools on the cloud platform based on the plurality of physical pools on the storage device connected to the cloud platform. That is, the cloud platform selects a physical pool on a specific storage device to be added to a specific virtual pool. In addition, the administrator further creates service-level agreements (SLAs), and associates the created SLAs with the created virtual pools. In this way, if a user needs to apply for a resource, the user may notify the cloud platform of an SLA of the resource for which the user applies, and the cloud platform allocates a corresponding virtual pool resource (which is created on the storage device actually) to the user based on the SLA.

An open cloud platform (OPENSTACK) is used as an example. Referring to a schematic diagram of a cloudification scenario shown in FIG. 1, the administrator connects the storage device to a Cinder component (which is responsible for block storage device management) and a Manila component (which is responsible for file storage device management), and actually, performs an action of storage and management pooling, that is, creates a virtual pool on the cloud platform based on the connected storage device. When the user applies to use two virtual storage resources of volume and share (file sharing) based on a service requirement, the two resources of the volume and the share are directly created on the storage device. Therefore, the two resources may coexist in a same physical pool. That is, at a virtual resource layer, the cloud platform records that specific virtual resources are occupied by a specific tenant, and therefore another tenant cannot access these virtual resources such that tenants may be isolated at the virtual resource layer. However, virtual resources for which a plurality of tenants apply may be isolated at the virtual resource layer, and these virtual resources may belong to a same physical pool. When the physical pool is damaged, the plurality of tenants is affected, and consequently data isolation is poor.

SUMMARY

Embodiments of the present disclosure provide a resource pool processing method and apparatus, and a device in order to resolve a technical problem that because tenant isolation is not performed on the physical pool, data isolation is poor and a plurality of tenants are affected when a shared physical pool is damaged.

According to a first aspect, an embodiment of the present disclosure provides a resource pool processing method, including obtaining a service template of a to-be-provisioned service, and determining, based on the service template, first SLA information corresponding to the to-be-provisioned service, where the first SLA information is used to represent a property of physical pool isolation between the to-be-provisioned service and an existing service, and resource information required by the to-be-provisioned service, determining whether there is SLA information matching the service template on a management server, if there is no SLA information matching the service template on the management server, creating a new storage device based on the first SLA information and preset storage infrastructure, creating a new virtual resource pool based on the new storage device, and associating the new virtual resource pool with a new SLA.

According to the resource pool processing method provided in the first aspect, the service template of the to-be-provisioned service is obtained, the first SLA information corresponding to the to-be-provisioned service is determined based on the service template, it is determined whether there is the SLA information matching the service template on the management server, and if there is no SLA information matching the service template on the management server, the management server creates the new storage device based on the first SLA information and the preset storage infrastructure, creates the new virtual resource pool based on the new storage device, and associates the new virtual resource pool with the new SLA. In this way, when a physical pool used by the to-be-provisioned service needs to be isolated from a physical pool used by the existing service, the management server may create, for the to-be-provisioned service, a virtual pool that exclusively occupies a physical pool on a storage device such that the physical pool used by the to-be-provisioned service is isolated from the physical pool used by the existing service. Therefore, even if a physical pool occupied by another virtual pool on the management server is damaged, data running of the to-be-provisioned service is not affected, and data isolation is greatly improved.

In a possible design, if the physical pool isolation property is physical pool isolated, the creating a new virtual resource pool based on the new storage device, and associating the new virtual resource pool with a new SLA includes creating the new virtual resource pool based on a physical pool on the new storage device, where the new virtual resource pool is independently corresponding to the physical pool on the new storage device, and creating the new SLA, and associating the new virtual resource pool with the new SLA.

According to the method provided in the possible design, the service template of the to-be-provisioned service is obtained, the first SLA information corresponding to the to-be-provisioned service is determined based on the service template, it is determined whether there is the SLA information matching the service template on the management server, and if there is no SLA information matching the service template on the management server, the management server creates the new storage device based on the first SLA information and the preset storage infrastructure, creates, based on the new storage device, the new virtual resource pool that exclusively occupies the new storage device, and associates the new virtual resource pool with the new SLA such that the physical pool used by the to-be-provisioned service is isolated from the physical pool used by the existing service. Therefore, even if a physical pool occupied by another virtual pool on the management server is damaged, data running of the to-be-provisioned service is not affected, and data isolation is greatly improved. In addition, when, the management server may create the new virtual pool using a storage orchestration subsystem without a need to deploy a storage device and a virtual pool by an administrator in order to greatly improve deployment efficiency of a new virtual pool.

In a possible design, if the physical pool isolation property is non-physical pool isolated, the creating a new virtual resource pool based on the new storage device, and associating the new virtual resource pool with a new SLA includes creating the new virtual resource pool based on at least one physical pool on the new storage device and at least one physical pool on another existing storage device, and creating the new SLA, and associating the new virtual resource pool with the new SLA.

In a possible design, before the creating a new storage device based on the first SLA information and preset storage infrastructure, the method further includes determining whether a storage capability of a storage device associated with each currently existing virtual resource pool meets the resource information required by the to-be-provisioned service in the service template, if no storage capability of the storage device associated with each currently existing virtual resource pool meets the resource information required by the to-be-provisioned service in the service template, determining whether a storage capability of a storage device that is not currently associated with any virtual pool meets the resource information required by the to-be-provisioned service in the service template, and if the storage device that is not currently associated with any resource pool does not meet the resource information required by the to-be-provisioned service in the service template, creating the new storage device based on the first SLA information and the preset storage infrastructure.

In a possible design, if a capability of a first storage device associated with a currently existing first virtual resource pool meets the resource information required by the to-be-provisioned service in the service template, an available physical pool on the first storage device is added to the first virtual resource pool, or storage space of a physical pool included in the first virtual resource pool is expanded.

In a possible design, if a capability of a first storage device that is not currently associated with any resource pool meets the resource information required by the to-be-provisioned service in the service template, the new virtual resource pool is created based on an available physical pool on the first storage device.

In a possible design, the first SLA information includes a resource type required by the to-be-provisioned service, a resource capacity required by the to-be-provisioned service, and a resource quality property required by the to-be-provisioned service, and the resource quality property required by the to-be-provisioned service includes the property of physical pool isolation between the to-be-provisioned service and the existing service, and determining whether there is SLA information matching the service template on a management server includes determining whether a SLA information on the management server matches the resource type required by the to-be-provisioned service, the resource capacity required by the to-be-provisioned service, and the resource quality property required by the to-be-provisioned service, and if the SLA information on the management server matches the resource type required by the to-be-provisioned service, the resource capacity required by the to-be-provisioned service, and the resource quality property required by the to-be-provisioned service, determining that there is the SLA information matching the service template on the management server, or if the SLA information on the management server does not match the resource type required by the to-be-provisioned service, the resource capacity required by the to-be-provisioned service, or the resource quality property required by the to-be-provisioned service, determining that there is no SLA information matching the service template on the management server.

In a possible design, the service template includes a conversion formula used for converting a service indicator to a resource capacity, a maximum value of the service indicator, the resource type required by the to-be-provisioned service, and the resource quality property required by the to-be-provisioned service.

According to the method provided in the possible designs, when there is no SLA information matching the service template of the to-be-provisioned service on the management server, the management server determines whether the storage capability of the storage device associated with each currently existing virtual resource pool meets the resource information required by the to-be-provisioned service in the service template, if no storage capability of the storage device associated with each currently existing virtual resource pool meets the resource information required by the to-be-provisioned service in the service template, further determines whether the storage capability of the storage device that is not currently associated with any virtual pool meets the resource information required by the to-be-provisioned service in the service template, and if the storage capability of the storage device that is not currently associated with any virtual pool does not meet the resource information required by the to-be-provisioned service in the service template, creates the new storage device based on the first SLA information and the preset storage infrastructure in order to create a more targeted new storage device. In addition, the management server may create the new virtual pool or expand an existing virtual pool using the storage orchestration subsystem without a need to deploy a storage device and a virtual pool by an administrator in order to greatly improve deployment efficiency of a new virtual pool.

According to a second aspect, an embodiment of the present disclosure provides a resource pool processing apparatus, including an obtaining module configured to obtain a service template of a to-be-provisioned service, and determine, based on the service template, first SLA information corresponding to the to-be-provisioned service, where the first SLA information is used to represent a property of physical pool isolation between the to-be-provisioned service and an existing service, and resource information required by the to-be-provisioned service, a first determining module configured to determine whether there is SLA information matching the service template on a management server, a first creation module configured to, when the first determining module determines that there is no SLA information matching the service template on the management server, create a new storage device based on the first SLA information and preset storage infrastructure, and a second creation module configured to create a new virtual resource pool based on the new storage device, and associate the new virtual resource pool with a new SLA.

In a possible design, if the physical pool isolation property is physical pool isolated, the second creation module is further configured to create the new virtual resource pool based on a physical pool on the new storage device, create the new SLA, and associate the new virtual resource pool with the new SLA, where the new virtual resource pool is independently corresponding to the physical pool on the new storage device.

In a possible design, if the physical pool isolation property is non-physical pool isolated, the second creation module is further configured to create the new virtual resource pool based on at least one physical pool on the new storage device and at least one physical pool on another existing storage device, create the new SLA, and associate the new virtual resource pool with the new SLA.

In a possible design, the apparatus further includes a second determining module configured to, before the first creation module creates the new storage device based on the first SLA information and the preset storage infrastructure, determine whether a storage capability of a storage device associated with each currently existing virtual resource pool meets the resource information required by the to-be-provisioned service in the service template, and a third determining module configured to, when no second determining module determines that the storage capability of the storage device associated with each currently existing virtual resource pool meets the resource information required by the to-be-provisioned service in the service template, determine whether a storage capability of a storage device that is not currently associated with any virtual pool meets the resource information required by the to-be-provisioned service in the service template, where the first creation module is further configured to, when the third determining module determines that the storage device that is not currently associated with any resource pool does not meet the resource information required by the to-be-provisioned service in the service template, create the new storage device based on the first SLA information and the preset storage infrastructure.

In a possible design, the apparatus further includes a first expansion module configured to, when the second determining module determines that a capability of a first storage device associated with a currently existing first virtual resource pool meets the resource information required by the to-be-provisioned service in the service template, add an available physical pool on the first storage device to the first virtual resource pool, or expand storage space of a physical pool included in the first virtual resource pool.

In a possible design, the apparatus further includes a second expansion module configured to, when the third determining module determines that a capability of a first storage device that is not currently associated with any resource pool meets the resource information required by the to-be-provisioned service in the service template, create the new virtual resource pool based on an available physical pool on the first storage device.

In a possible design, the first SLA information includes a resource type required by the to-be-provisioned service, a resource capacity required by the to-be-provisioned service, and a resource quality property required by the to-be-provisioned service, and the resource quality property required by the to-be-provisioned service includes the property of physical pool isolation between the to-be-provisioned service and the existing service, and the first determining module is configured to determine whether an SLA information on the management server matches the resource type required by the to-be-provisioned service, the resource capacity required by the to-be-provisioned service, and the resource quality property required by the to-be-provisioned service, and if the SLA information on the management server matches the resource type required by the to-be-provisioned service, the resource capacity required by the to-be-provisioned service, and the resource quality property required by the to-be-provisioned service, determine that there is the SLA information matching the service template on the management server, or if the SLA information on the management server does not match the resource type required by the to-be-provisioned service, the resource capacity required by the to-be-provisioned service, or the resource quality property required by the to-be-provisioned service, determine that there is no SLA information matching the service template on the management server.

In a possible design, the service template includes a conversion formula used for converting a service indicator to a resource capacity, a maximum value of the service indicator, the resource type required by the to-be-provisioned service, and the resource quality property required by the to-be-provisioned service.

For beneficial effects of the resource pool processing apparatus provided in the second aspect and the possible designs of the second aspect, refer to beneficial effects brought by the first aspect and the possible designs of the first aspect. Details are not described herein again.

According to a third aspect, an embodiment of the present disclosure provides a management server, including an input interface configured to obtain a service template of a to-be-provisioned service, and a processor configured to determine, based on the service template, first SLA information corresponding to the to-be-provisioned service, and determine whether there is SLA information matching the service template on a management server, and if there is no SLA information matching the service template on the management server, create a new storage device based on the first SLA information and preset storage infrastructure, create a new virtual resource pool based on the new storage device, and associate the new virtual resource pool with a new SLA, where the first SLA information is used to represent a property of physical pool isolation between the to-be-provisioned service and an existing service, and resource information required by the to-be-provisioned service.

In a possible design, if the physical pool isolation property is physical pool isolated, the processor is further configured to create the new virtual resource pool based on a physical pool on the new storage device, create the new SLA, and associate the new virtual resource pool with the new SLA, where the new virtual resource pool is independently corresponding to the physical pool on the new storage device.

In a possible design, if the physical pool isolation property is non-physical pool isolated, the processor is further configured to create the new virtual resource pool based on at least one physical pool on the new storage device and at least one physical pool on another existing storage device, create the new SLA, and associate the new virtual resource pool with the new SLA.

In a possible design, the processor is further configured to, before creating the new storage device based on the first SLA information and the preset storage infrastructure, determine whether a storage capability of a storage device associated with each currently existing virtual resource pool meets the resource information required by the to-be-provisioned service in the service template, if no storage capability of the storage device associated with each currently existing virtual resource pool meets the resource information required by the to-be-provisioned service in the service template, determine whether a storage capability of a storage device that is not currently associated with any virtual pool meets the resource information required by the to-be-provisioned service in the service template, and if the storage device that is not currently associated with any resource pool does not meet the resource information required by the to-be-provisioned service in the service template, create the new storage device based on the first SLA information and the preset storage infrastructure.

In a possible design, the processor is further configured to, when a capability of a first storage device associated with a currently existing first virtual resource pool meets the resource information required by the to-be-provisioned service in the service template, add an available physical pool on the first storage device to the first virtual resource pool, or expand storage space of a physical pool included in the first virtual resource pool.

In a possible design, the processor is further configured to, when a capability of a first storage device that is not currently associated with any resource pool meets the resource information required by the to-be-provisioned service in the service template, create the new virtual resource pool based on an available physical pool on the first storage device.

In a possible design, the first SLA information includes a resource type required by the to-be-provisioned service, a resource capacity required by the to-be-provisioned service, and a resource quality property required by the to-be-provisioned service, and the resource quality property required by the to-be-provisioned service includes the property of physical pool isolation between the to-be-provisioned service and the existing service, and the processor is further configured to determine whether an SLA information on the management server matches the resource type required by the to-be-provisioned service, the resource capacity required by the to-be-provisioned service, and the resource quality property required by the to-be-provisioned service, and if the SLA information on the management server matches the resource type required by the to-be-provisioned service, the resource capacity required by the to-be-provisioned service, and the resource quality property required by the to-be-provisioned service, determine that there is the SLA information matching the service template on the management server, or if the SLA information on the management server does not match the resource type required by the to-be-provisioned service, the resource capacity required by the to-be-provisioned service, or the resource quality property required by the to-be-provisioned service, determine that there is no SLA information matching the service template on the management server.

In a possible design, the service template includes a conversion formula used for converting a service indicator to a resource capacity, a maximum value of the service indicator, the resource type required by the to-be-provisioned service, and the resource quality property required by the to-be-provisioned service.

For beneficial effects of the management server provided in the third aspect and the possible designs of the third aspect, refer to beneficial effects brought by the first aspect and the possible designs of the first aspect. Details are not described herein again.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show some embodiments of the present disclosure, and a person of ordinary skill in the art may derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 2:
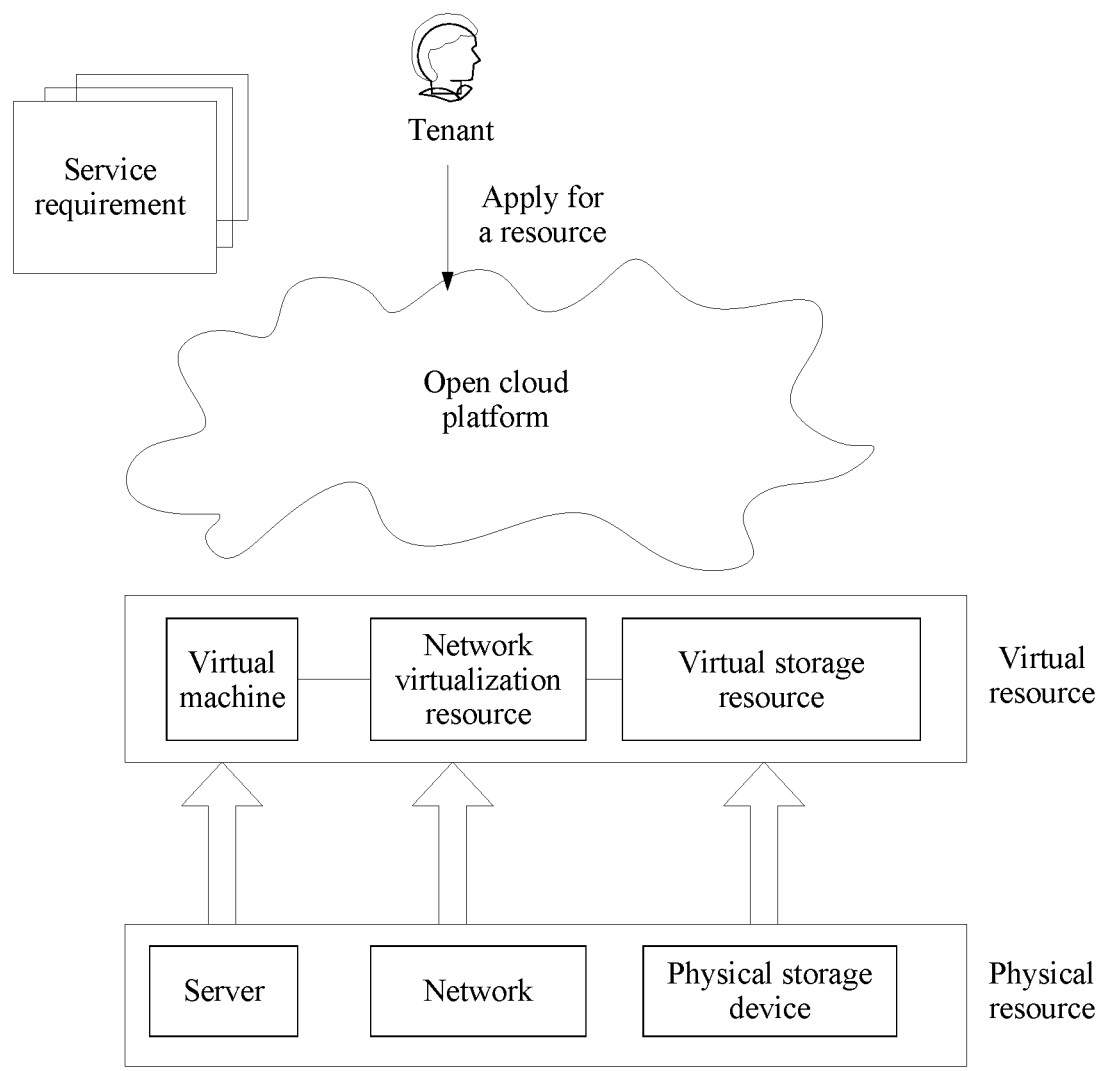
FIG. 2 is a diagram of a resource allocation scenario according to an embodiment of the present disclosure.

A resource pool processing method in this embodiment of the present disclosure may be applied to a resource allocation scenario shown in FIG. 2. As shown in FIG. 2, the scenario includes a cloud platform, a physical resource including a physical device, and a virtual resource obtained after a physical resource is virtualized. The physical resource may include a host, a network, and a storage resource, and the virtual resource may include a virtual machine obtained after the host is virtualized, a virtual network resource, and a virtual storage resource. A user may send a resource application request to the cloud platform to obtain a corresponding storage resource from the cloud platform.

Figure 3:
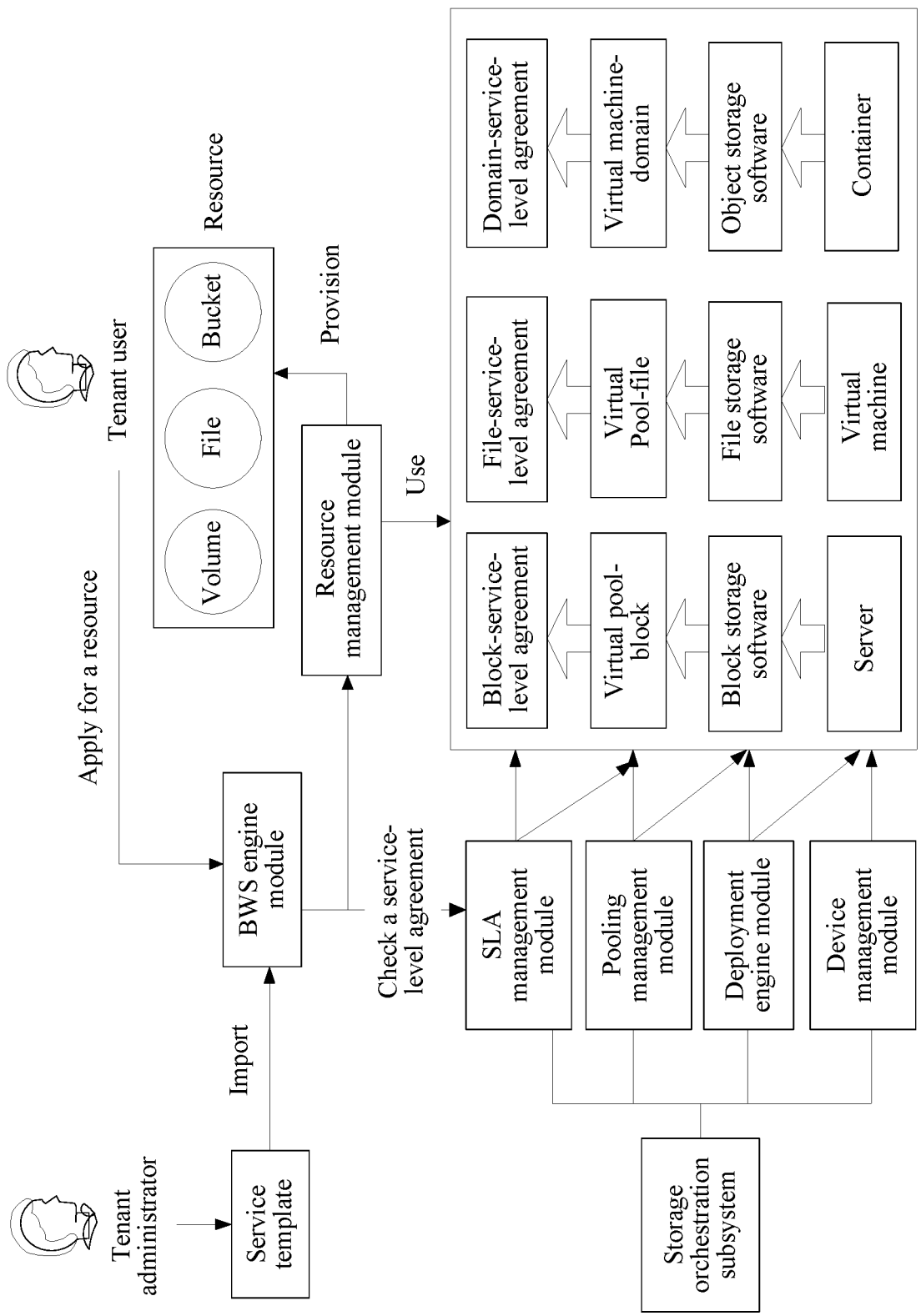
FIG. 3 is a schematic structural diagram of a resource allocation apparatus according to an embodiment of the present disclosure.

The resource pool processing method in this embodiment of the present disclosure may be applied to a resource allocation apparatus shown in FIG. 3, and the resource allocation apparatus may be applied to the scenario shown in FIG. 2. In FIG. 3, the resource allocation apparatus includes a storage orchestration subsystem, a business workload service (BWS) engine module, and a resource management module. The storage orchestration subsystem includes a device management module, a deployment engine module, a pooling management module, and a SLA management module. The device management module is configured to monitor storage infrastructure in order to provision available storage infrastructure for a tenant, for example, monitor hardware such as Commodity Hardware+OS, or a server, a virtual machine (also referred to as VM), or a container. The storage infrastructure may be physical hardware, or may be a virtual appliance. The deployment engine module is configured to install storage software such as FusionStorage-Block, FusionStorage-File, or FusionStorage-Object in the storage infrastructure in order to form a storage device. The pooling management module is configured to create a virtual resource pool (a virtual pool for short in the following) on a cloud platform based on a physical pool on the storage device. The SLA management module is configured to create an associated SLA for the virtual pool created by the pooling management module. One virtual pool may be associated with at least one SLA. The BWS engine module is mainly configured to, after a service template that is defined by an administrator for a to-be-provisioned service is imported to the BWS engine module, determine whether there is SLA information that can match the service template on a management server (that is, determine whether there currently is SLA information that can meet a resource requirement of the to-be-provisioned service on the management server), and if there is no SLA information that can match the service template on the management server, send a storage resource construction requirement to the storage orchestration subsystem, to construct a storage resource that can meet the service template. The resource management module is configured to provision a corresponding storage resource for a user, such as a block resource, a file resource, or a bucket resource.

Figure 1:
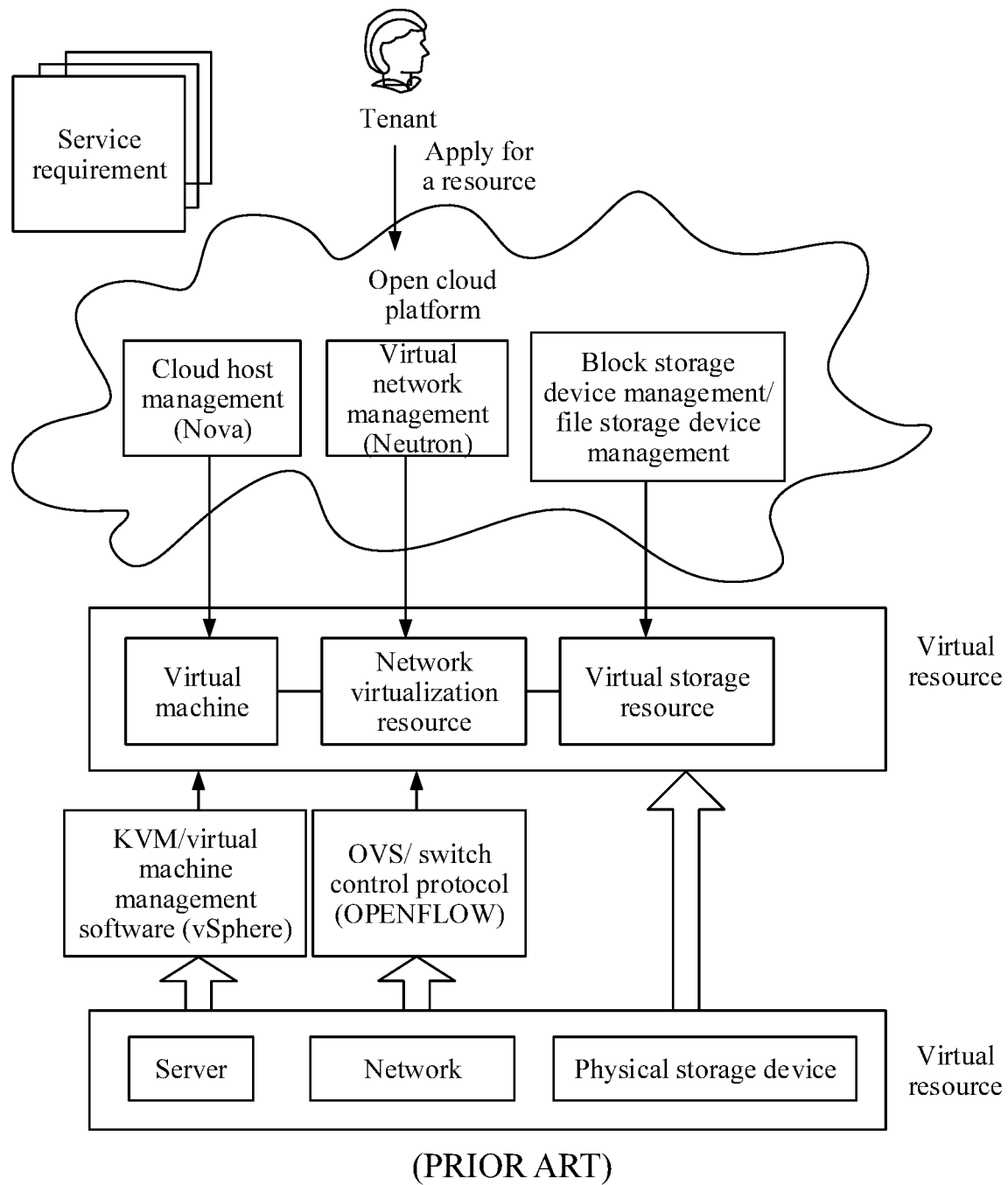
FIG. 1 is a schematic diagram of a cloudification scenario according to an embodiment of the present disclosure.

In addition, the following explains terms in FIG. 1. KVM in FIG. 1 is Kernel-based Virtual Machine, vSphere is a name of virtual machine management software of the VMware company, Nova and Neutron are project/component names of OPENSTACK, the Nova is responsible for cloud host management, and the Neutron is responsible for virtual network management, OVS is Open vSwitch, namely, an open-source software-defined switch, and OPENFLOW is a switch control protocol used in software-defined networking (SDN).

In the other approaches, during creation of a virtual pool, the administrator connects the storage device to a Cinder component (which is responsible for block storage device management) and a Manila component (which is responsible for file storage device management), and the cloud platform creates a virtual pool on the cloud platform based on the connected storage device. When the user applies to use two virtual storage resources of volume and share (file sharing) based on a service requirement, the two resources of the volume and the share are directly created on the storage device. Therefore, the two resources may coexist in a same physical pool. That is, at a virtual resource layer, the cloud platform records that specific virtual resources are occupied by a specific tenant, and therefore another tenant cannot access these virtual resources such that tenants may be isolated at the virtual resource layer. However, virtual resources for which a plurality of tenants apply may be isolated at the virtual resource layer, and these virtual resources may belong to a same physical pool. When the physical pool is damaged, the plurality of tenants is affected, and consequently data isolation is poor.

The resource pool processing method in this embodiment of the present disclosure aims to resolve a technical problem that because tenant isolation is not performed on the physical pool, data isolation is poor and a plurality of tenants are affected when a shared physical pool is damaged.

Optionally, the following method embodiments may be performed by the management server, or may be performed by the resource allocation apparatus (as shown in FIG. 3) integrated into the management server. The apparatus may be implemented using hardware, software, or a combination of hardware and software. Optionally, an example in which the following method embodiments are performed by the management server is used for description.

Specific embodiments are used below to describe in detail the technical solutions of the present disclosure. The following several specific embodiments may be combined with each other, and a same or similar concept or process may not be described repeatedly in some embodiments.

Figure 4:
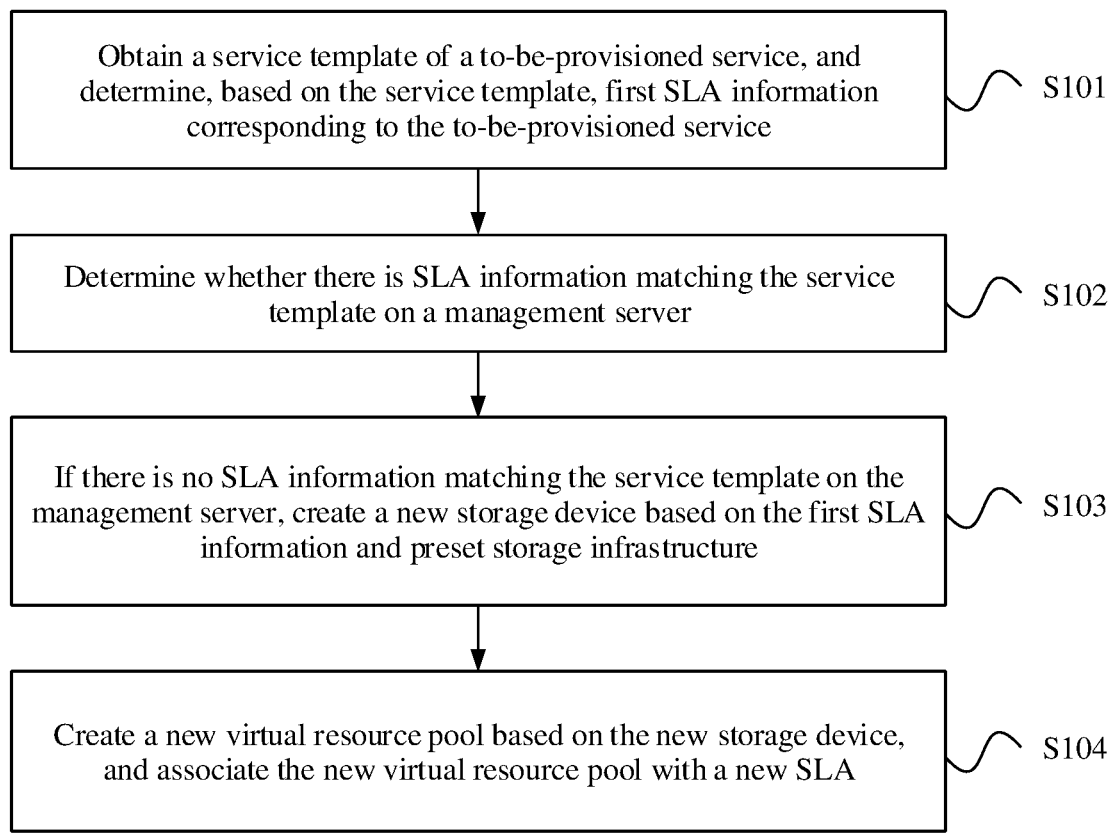
FIG. 4 is a schematic flowchart of Embodiment 1 of a resource pool processing method according to an embodiment of the present disclosure.

FIG. 4 is a schematic flowchart of Embodiment 1 of a resource pool processing method according to an embodiment of the present disclosure. In a specific process in this embodiment of the present disclosure, an administrator defines a service template for a to-be-provisioned service, and a management server determines a property of physical pool isolation between the to-be-provisioned service and an existing service based on the service template in order to determine whether to create a virtual pool that exclusively occupies a physical pool on a new storage device. Therefore, when a user applies for a storage resource for the to-be-provisioned service, a case of sharing a same physical pool with another service is avoided. As shown in FIG. 4, the method includes the following steps.

Step S101. Obtain a service template of a to-be-provisioned service, and determine, based on the service template, first SLA information corresponding to the to-be-provisioned service.

The first SLA information is used to represent a property of physical pool isolation between the to-be-provisioned service and an existing service, and resource information required by the to-be-provisioned service.

Further, the administrator may define a service template for each to-be-provisioned service, that is, one to-be-provisioned service corresponds to one service template. For convenience, in this embodiment of the present disclosure, one to-be-provisioned service is used as an example for description.

After the administrator defines the service template of the to-be-provisioned service, the administrator enters the service template to the management server, and the management server may import the service template to the BWS engine module in FIG. 3. The BWS engine module may determine, based on the service template, the first SLA information corresponding to the to-be-provisioned service. The first SLA information may represent the property of physical pool isolation between the to-be-provisioned service and the existing service on the management server, that is, represent whether a physical pool of the to-be-provisioned service needs to be isolated from a physical pool of the existing service on the management server. The first SLA information may represent the resource information required by the to-be-provisioned service, for example, a resource type required by the to-be-released service and a storage resource capacity required by the to-be-provisioned service.

Step S102. Determine whether there is SLA information matching the service template on the management server.

Further, after obtaining, through parsing, the first SLA information of the service template based on the service template, the management server determines whether there is the SLA information matching the service template on the management server, that is, determines whether there is a virtual pool meeting the first SLA information on the management server. The SLA information may include an SLA of a virtual pool on the management server, a resource type of the virtual pool, a quality property of a resource in the virtual pool, and a capacity size of the virtual pool. The quality property may represent an isolation property of a physical pool associated with the virtual pool, that is, the quality property represents whether the virtual pool exclusively occupies a physical pool on a storage device or shares a physical pool on a storage device with another virtual pool. Optionally, the quality property may further include a disk type, a raid level, and the like.

Step S103. If there is no SLA information matching the service template on the management server, create a new storage device based on the first SLA information and preset storage infrastructure.

Further, when the management server determines that there is no SLA information matching the service template on the management server, the management server sends a storage resource construction requirement to a storage orchestration subsystem using the BWS engine module. The storage orchestration subsystem obtains, through analysis, the first SLA information of the service template based on the service template, and then creates the new storage device based on the first SLA information and the preset storage infrastructure. The preset storage infrastructure may be the Commodity Hardware+OS, the VM, the container, and the like in FIG. 3, and the preset storage infrastructure may be provisioned by the device management module for each tenant. The preset storage infrastructure is available storage infrastructure. A specific process of creating the new storage device by the storage orchestration subsystem may be that after obtaining the preset storage infrastructure, the storage orchestration subsystem installs, based on the first SLA information, corresponding storage software in the storage infrastructure using a deployment engine module in order to obtain the new storage device, and creates a physical pool on the new storage device.

Step S104. Create a new virtual resource pool based on the new storage device, and associate the new virtual resource pool with a new SLA.

Further, after obtaining the new storage device, the management server creates a physical pool on the new storage device, creates, using the pooling management module in FIG. 3, the new virtual resource pool based on the physical pool on the new storage device, and associates the new virtual resource pool with the new SLA. In this way, the management server successfully creates a virtual pool for the to-be-provisioned service. When subsequently applying for a resource for the to-be-provisioned service, the user may apply for a resource based on the service template of the to-be-provisioned service or the SLA.

It should be noted that when the physical pool isolation property of the to-be-provisioned service is that the physical pool used by the to-be-provisioned service needs to be isolated from the physical pool used by the existing service, the new virtual pool needs to exclusively occupy a physical pool on the new storage device during creation of the new virtual pool, or when the physical pool isolation property of the to-be-provisioned service is that the physical pool used by the to-be-provisioned service does not need to be isolated from the physical pool used by the existing service (that is, only logical isolation needs to be performed at a virtual resource layer), the new virtual pool may not exclusively occupy a physical pool on the new storage device during creation of the new virtual pool.

Based on this, if the physical pool isolation property of the to-be-provisioned service is that the physical pool used by the to-be-provisioned service needs to be isolated from the physical pool used by the existing service, the management server may create, for the to-be-provisioned service, a virtual pool that exclusively occupies a physical pool on a storage device such that the physical pool used by the to-be-provisioned service is isolated from the physical pool used by the existing service. Therefore, even if a physical pool occupied by another virtual pool on the management server is damaged, data running of the to-be-provisioned service is not affected, and data isolation is greatly improved.

According to the resource pool processing method provided in this embodiment of the present disclosure, the service template of the to-be-provisioned service is obtained, the first SLA information corresponding to the to-be-provisioned service is determined based on the service template, it is determined whether there is the SLA information matching the service template on the management server, and if there is no SLA information matching the service template on the management server, the management server creates the new storage device based on the first SLA information and the preset storage infrastructure, creates the new virtual resource pool based on the new storage device, and associates the new virtual resource pool with the new SLA. In this way, when the physical pool used by the to-be-provisioned service needs to be isolated from the physical pool used by the existing service, the management server may create, for the to-be-provisioned service, a virtual pool that exclusively occupies a physical pool on a storage device such that the physical pool used by the to-be-provisioned service is isolated from the physical pool used by the existing service. Therefore, even if a physical pool occupied by another virtual pool on the management server is damaged, data running of the to-be-provisioned service is not affected, and data isolation is greatly improved.

Figure 5:
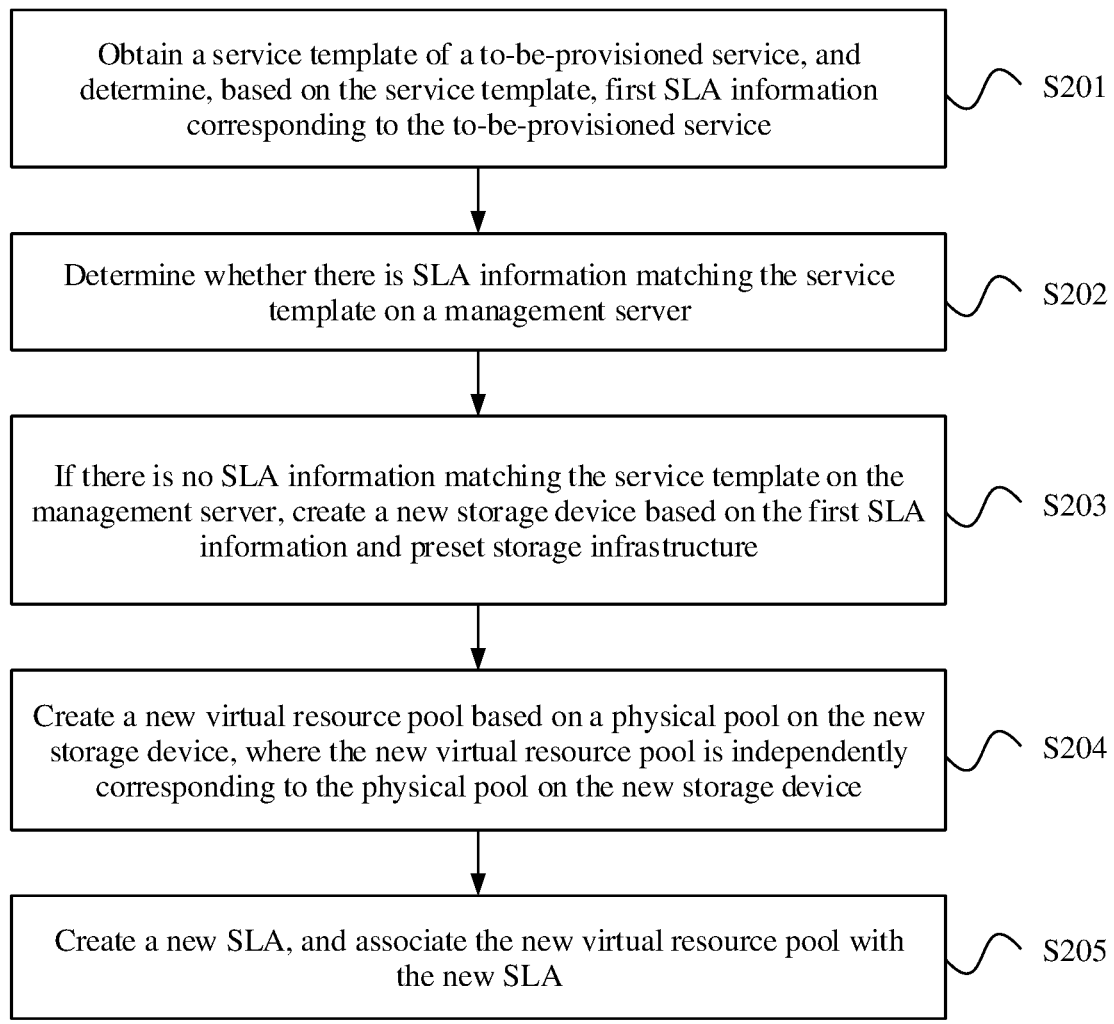
FIG. 5 is a schematic flowchart of Embodiment 2 of a resource pool processing method according to an embodiment of the present disclosure.

FIG. 5 is a schematic flowchart of Embodiment 2 of a resource pool processing method according to an embodiment of the present disclosure. In a specific process in this embodiment, a management server deploys a new virtual resource pool when a physical pool used by a to-be-provisioned service needs to be isolated from a physical pool used by an existing service, and there is no SLA information meeting a resource requirement of the to-be-provisioned service on the management server (that is, there is no SLA information matching a service template of the to-be-provisioned service on the management server). Based on the foregoing embodiment, further, the method includes the following steps.

Step S201. Obtain a service template of a to-be-provisioned service, and determine, based on the service template, first SLA information corresponding to the to-be-provisioned service.

The first SLA information is used to represent a property of physical pool isolation between the to-be-provisioned service and an existing service, and resource information required by the to-be-provisioned service.

Further, the first SLA information may include a resource type required by the to-be-provisioned service, a resource capacity required by the to-be-provisioned service, and a resource quality property required by the to-be-provisioned service. The resource quality property required by the to-be-provisioned service may include the property of physical pool isolation between the to-be-provisioned service and the existing service, and may further include a disk type, a raid level, and the like required by the to-be-provisioned service.

Step S202. Determine whether there is SLA information matching the service template on the management server.

Further, when determining whether there is the SLA information matching the service template on the management server, the management server actually determines whether SLA information on the management server matches the resource type required by the to-be-provisioned service, the resource capacity required by the to-be-provisioned service, and the resource quality property required by the to-be-provisioned service. SLA information of each virtual pool on the management server includes a SLA of the virtual pool, a resource type of the virtual pool, a quality property of a resource in the virtual pool, and a capacity size of the virtual pool. Therefore, during determining, it is determined whether the resource type of the virtual pool on the management server is the same as the resource type required by the to-be-provisioned service, whether a remaining resource capacity of the virtual pool on the management server is greater than the resource capacity required by the to-be-provisioned service, and whether the quality property of the resource in the virtual pool on the management server matches the resource quality property required by the to-be-provisioned service.

When all the three conditions are met, the management server determines that there is the SLA information matching the service template of the to-be-provisioned service on the management server. If any one of the three conditions is not met, it is determined that there is no SLA information matching the service template of the to-be-provisioned service on the management server.

Step S203. If there is no SLA information matching the service template on the management server, create a new storage device based on the first SLA information and preset storage infrastructure.

For a specific description of this step, refer to the description in the foregoing embodiment. Details are not described herein again. It should be noted that after the new storage device is created, a physical pool may be created based on the new storage device.

Step S204. Create a new virtual resource pool based on a physical pool on the new storage device, where the new virtual resource pool is independently corresponding to the physical pool on the new storage device.

Step S205. Create a new SLA, and associate the new virtual resource pool with the new SLA.

Further, when the physical pool isolation property of the to-be-provisioned service is that a physical pool used by the to-be-provisioned service needs to be isolated from a physical pool used by the existing service, after creating the new storage device, the management server determines the physical pool on the new storage device, and creates the new virtual pool based on the physical pool on the new storage device. The new virtual pool is independently corresponding to the physical pool on the new storage device. That is, the new virtual pool exclusively occupies the physical pool on the new storage device, and another virtual pool is not allowed to occupy the physical pool on the new storage device. In this way, after creating the new virtual pool, the management server creates the new SLA, and associates the new virtual pool with the new SLA. In this way, the management server redeploys a new virtual pool based on a currently existing virtual pool such that the physical pool used by the to-be-provisioned service is isolated from the physical pool used by the existing service. Therefore, even if a physical pool occupied by another virtual pool on the management server is damaged, data running of the to-be-provisioned service is not affected, and data isolation is greatly improved.

Further, the management server may create the new virtual pool using the storage orchestration subsystem without a need to deploy a storage device and a virtual pool by an administrator in order to greatly improve deployment efficiency of a new virtual pool.

According to the resource pool processing method provided in this embodiment of the present disclosure, the service template of the to-be-provisioned service is obtained, the first SLA information corresponding to the to-be-provisioned service is determined based on the service template, it is determined whether there is the SLA information matching the service template on the management server, and if there is no SLA information matching the service template on the management server, the management server creates the new storage device based on the first SLA information and the preset storage infrastructure, creates, based on the new storage device, the new virtual resource pool that exclusively occupies the new storage device, and associates the new virtual resource pool with the new SLA such that the physical pool used by the to-be-provisioned service is isolated from the physical pool used by the existing service. Therefore, even if a physical pool occupied by another virtual pool on the management server is damaged, data running of the to-be-provisioned service is not affected, and data isolation is greatly improved. In addition, the management server may create the new virtual pool using the storage orchestration subsystem without a need to deploy a storage device and a virtual pool by an administrator in order to greatly improve deployment efficiency of a new virtual pool.

Figure 6:
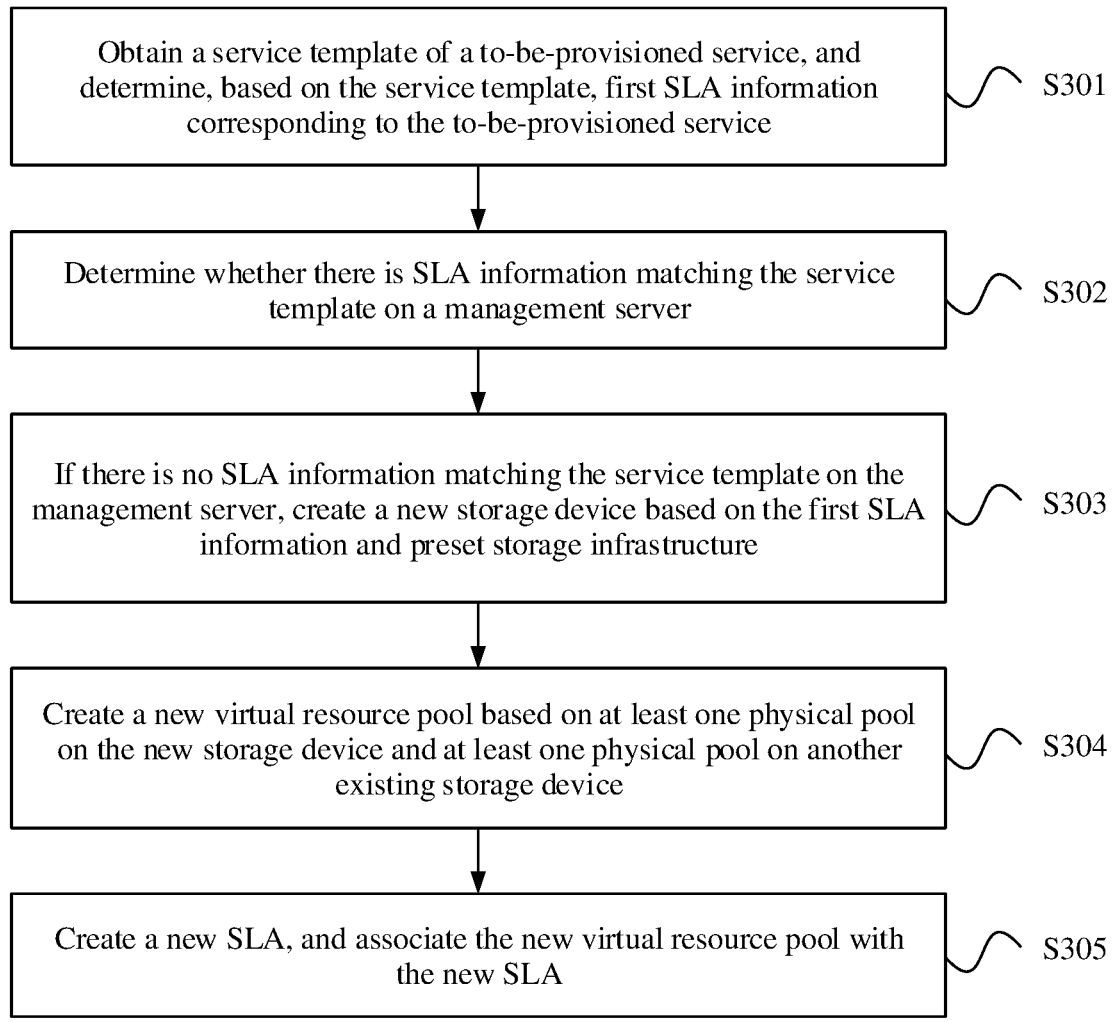
FIG. 6 is a schematic flowchart of Embodiment 3 of a resource pool processing method according to an embodiment of the present disclosure.

FIG. 6 is a schematic flowchart of Embodiment 3 of a resource pool processing method according to an embodiment of the present disclosure. In a specific process in this embodiment, when a physical pool used by a to-be-provisioned service does not need to be isolated from a physical pool used by an existing service, only logical isolation needs to be performed at a virtual resource layer, and there is no SLA information meeting a resource requirement of the to-be-provisioned service on a management server (that is, there is no SLA information matching a service template of the to-be-provisioned service on the management server), the management server creates a new virtual pool to meet the resource requirement of the to-be-provisioned service. Based on the foregoing embodiment, further, step S104 may further include the following steps.

Step S301. Obtain a service template of a to-be-provisioned service, and determine, based on the service template, first SLA information corresponding to the to-be-provisioned service.

Step S302. Determine whether there is SLA information matching the service template on the management server.

Step S303. If there is no SLA information matching the service template on the management server, create a new storage device based on the first SLA information and preset storage infrastructure.

Further, for a specific process of step S301 to step S303, refer to the specific description of step S201 to step S203. Details are not described herein again.

Step S304. Create a new virtual resource pool based on at least one physical pool on the new storage device and at least one physical pool on another existing storage device.

Step S305. Create a new SLA, and associate the new virtual resource pool with the new SLA.

Further, when a physical pool isolation property of the to-be-provisioned service is that a physical pool used by the to-be-provisioned service does not need to be isolated from a physical pool used by an existing service, after creating the new storage device, the management server determines the physical pool on the new storage device, and creates the new virtual pool based on the physical pool on the new storage device and the at least one physical pool on the other existing storage device. In this way, after creating the new virtual pool, the management server creates the new SLA, and associates the new virtual pool with the new SLA. Therefore, the management server expands the virtual pool based on a currently existing virtual pool such that the management server creates, for the to-be-provisioned service, a virtual pool meeting the resource requirement of the to-be-provisioned service. In this embodiment, the management server may create the new virtual pool using the storage orchestration subsystem without a need to deploy a storage device and a virtual pool by an administrator in order to greatly improve expansion efficiency of a new virtual pool.

Figure 7A:
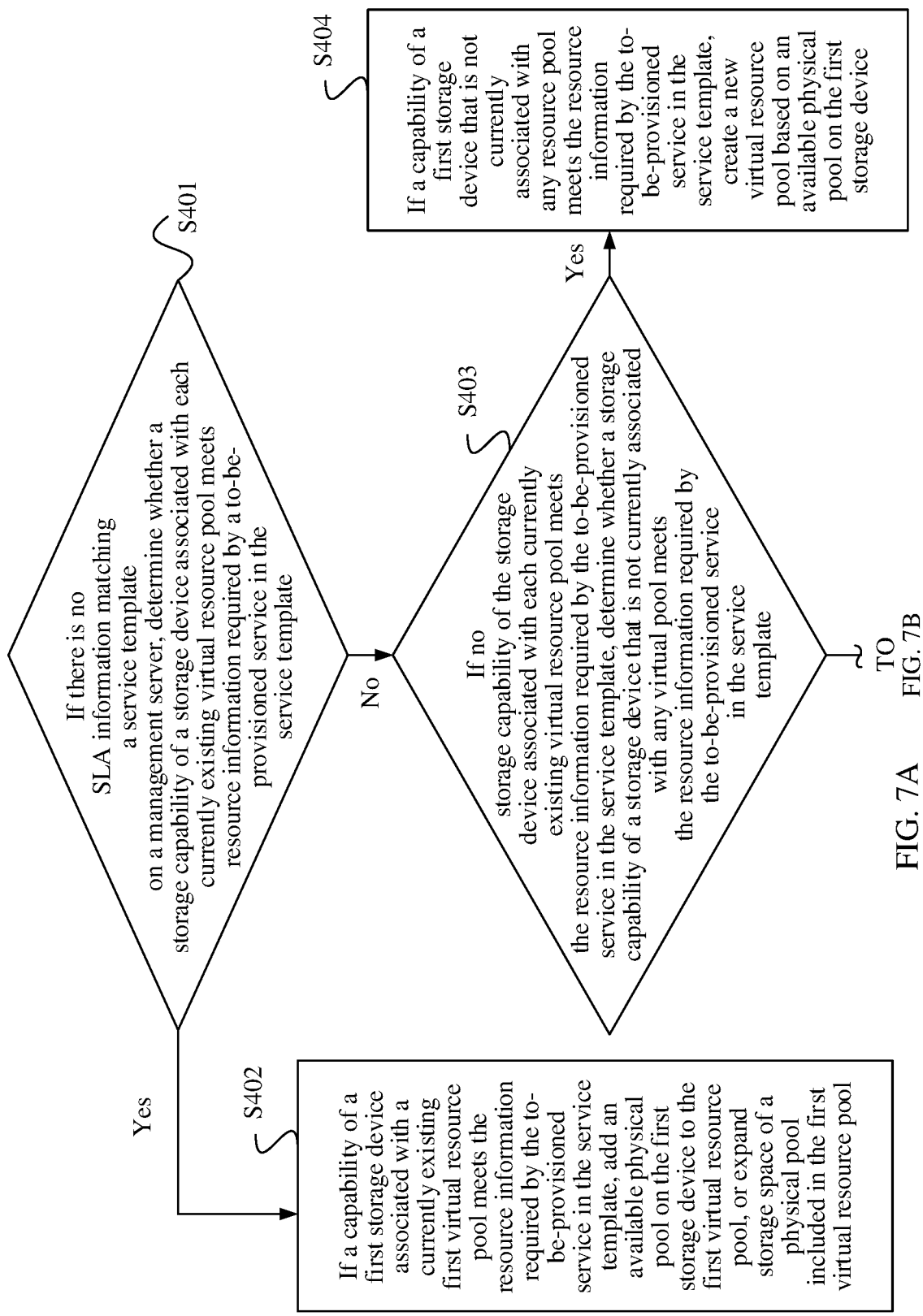
FIG. 7A and FIG. 7B are a schematic flowchart of Embodiment 4 of a resource pool processing method according to an embodiment of the present disclosure.
Figure 7B:
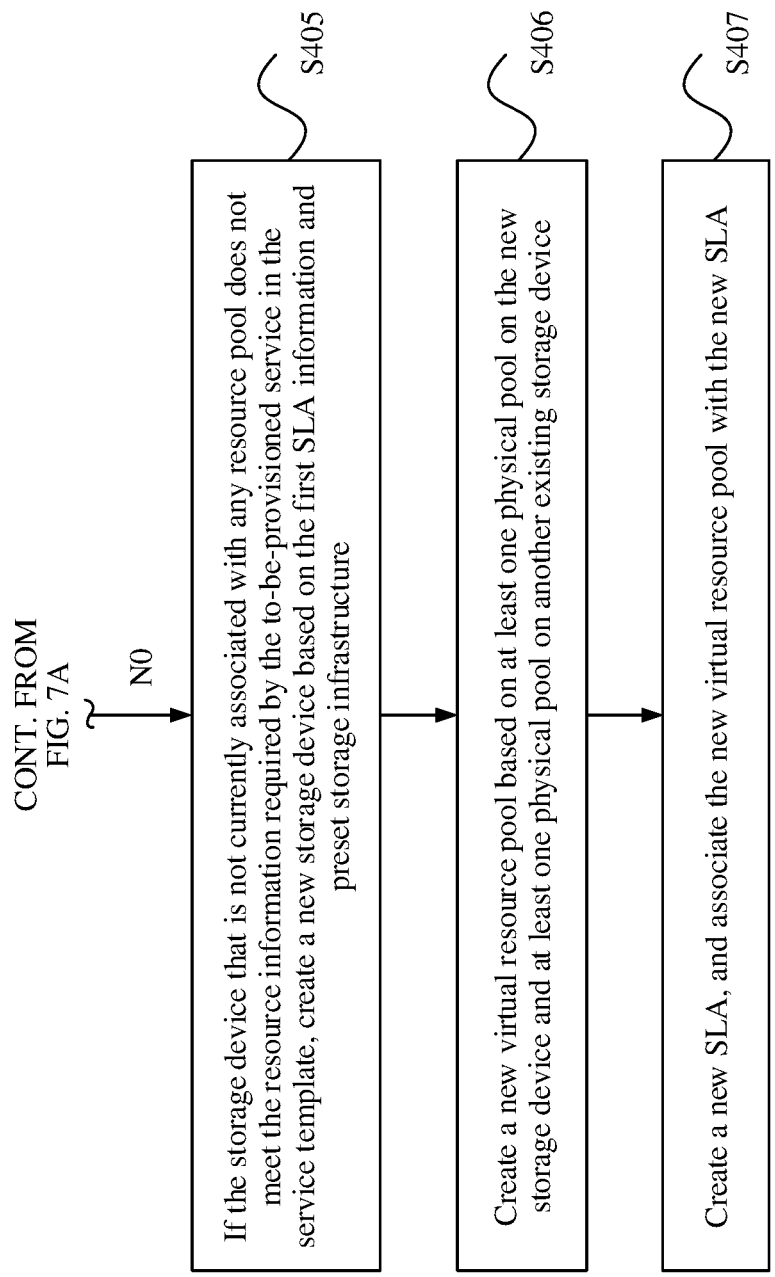

Further, for a process of expanding the virtual pool by the management server, this embodiment of the present disclosure provides Embodiment 4 of a resource pool processing method, as shown in FIG. 7A and FIG. 7B. Before creating a new storage device based on the first SLA information and preset storage infrastructure, the method further includes following steps.

Step S401. If there is no SLA information matching the service template on the management server, determine whether a storage capability of a storage device associated with each currently existing virtual resource pool meets resource information required by the to-be-provisioned service in the service template, and if the storage capability of the storage device associated with each currently existing virtual resource pool meets the resource information required by the to-be-provisioned service in the service template, perform step S402, or if no storage capability of the storage device associated with each currently existing virtual resource pool meets the resource information required by the to-be-provisioned service in the service template, perform step S403.

Further, when the management server determines that there is no SLA information matching the service template of the to-be-provisioned service on the management server, that is, there is no SLA information meeting the resource requirement of the to-be-provisioned service on the management server, the management server continues to determine whether a storage capability of a storage device associated with each virtual pool (the virtual pool is a virtual pool that is not exclusively occupied by an existing physically-isolated service, that is, the virtual pool may share a physical pool on a storage device with another virtual pool) on the management server meets the resource information required by the to-be-provisioned service in the service template. That is, the management server determines whether the following three conditions are met, whether a resource type of the storage device associated with each virtual pool is the same as a resource type required by the to-be-provisioned service, whether a remaining resource capacity of the storage device associated with each virtual pool is greater than a resource capacity required by the to-be-provisioned service, and whether a quality property of a resource in the storage device associated with each virtual pool matches a resource quality property required by the to-be-provisioned service.

When storage devices associated with one or more virtual pools on the management server meets all the three conditions, step S402 is performed. If any one of the three conditions is not met, it is determined that no storage capability of the storage device associated with each currently existing virtual resource pool on the management server meets the resource information required by the to-be-provisioned service in the service template, and step S403 is performed.

Step S402. If a capability of a first storage device associated with a currently existing first virtual resource pool meets the resource information required by the to-be-provisioned service in the service template, add an available physical pool on the first storage device to the first virtual resource pool, or expand storage space of a physical pool included in the first virtual resource pool.

Further, when the management server determines that the capability of the first storage device associated with the first virtual resource pool in currently existing virtual pools meets the resource information required by the to-be-provisioned service in the service template, that is, meets the three conditions in step S401, the management server may expand the first virtual pool. Optionally, the management server may add the available physical pool on the first storage device to the first virtual resource pool, may create one or more new physical pools on the first storage device, and then add the new created physical pools to the first virtual pool, or may expand storage space of the physical pool included in the first virtual resource pool, and then associate the virtual pool with the new SLA after expansion.

Optionally, the first storage device is a storage device associated with the first virtual resource pool, and there may be one or more first storage devices.

Step S403. If no storage capability of the storage device associated with each currently existing virtual resource pool meets the resource information required by the to-be-provisioned service in the service template, determine whether a storage capability of a storage device that is not currently associated with any virtual pool meets the resource information required by the to-be-provisioned service in the service template, and if the storage capability of the storage device that is not currently associated with any virtual pool meets the resource information required by the to-be-provisioned service in the service template, perform step S404, or if the storage capability of the storage device that is not currently associated with any virtual pool does not meet the resource information required by the to-be-provisioned service in the service template, perform step S405 to step S407.

Further, when the management server determines that no storage capability of the storage device associated with each currently existing virtual resource pool meets the resource information required by the to-be-provisioned service, the management server continues to determine whether the capability of the storage device that is not currently associated with any virtual pool on the management server meets the resource information required by the to-be-provisioned service. For a specific determining process, refer to the description in step S401.

Step S404. If a capability of a first storage device that is not currently associated with any resource pool meets the resource information required by the to-be-provisioned service in the service template, create the new virtual resource pool based on an available physical pool on the first storage device.

Further, when the management server determines that the storage capability of the first storage device that is not currently associated with any virtual pool meets the resource information required by the to-be-provisioned service, that is, meets the three conditions in step S401, the management server may create the new virtual pool based on the physical pool on the first storage device, and associate the new virtual pool with the new SLA.

Step S405. If the storage device that is not currently associated with any resource pool does not meet the resource information required by the to-be-provisioned service in the service template, create the new storage device based on the first SLA information and the preset storage infrastructure.

Step S406. Create the new virtual resource pool based on at least one physical pool on the new storage device and at least one physical pool on another existing storage device.

Step S407. Create the new SLA, and associate the new virtual resource pool with the new SLA.

Further, when the management server determines that the capability of the storage device that is not currently associated with any virtual pool does not meet the resource information required by the to-be-provisioned service, the management server may create the new storage device based on the first SLA information and the preset storage infrastructure in the service template, and create the new virtual pool based on the new storage device. For a specific process of step S405 to step S407, refer to the description in the embodiment shown in FIG. 6. Details are not described herein again.

Optionally, the service template includes a conversion formula used for converting a service indicator to a resource capacity, a maximum value of the service indicator, the resource type required by the to-be-provisioned service, and the resource quality property required by the to-be-provisioned service. For an example, refer to the following service template:

```
parameters:
    -az
    -app_name
    -host1-name
    -host2_name
    -host2_iqn_wwns
    -user_number
    -data_capacity — (the service indicator)
defines:
    -size:
    {calc:(user_number*1000)*(data_capacity*1.0/10**6)*2*1.2} — the conversion formula
    ...
    resource:
    volume_group1:
        type:volume — the resource type required by the to-be-provisioned service
        count:4
        properties: — the resource quality property required by the to-be-provisioned service
        az:{calc:az}
        name:{calc:app_name+"_data_volume"}
        raid_level:RAID10
        disk_type:SSD
        size:{calc:size}
    volume_group2:
    ....
```

It should be noted that, the foregoing service template is merely an example of an extracted part, and a specific form of the service template is not limited in this embodiment of the present disclosure.

When a user needs to apply for a physical-pool-isolated virtual pool for the to-be-provisioned service, the user may fill the service template of the to-be-provisioned service with the service indicator of the to-be-provisioned service such that the management server can determine, based on the maximum value of the service indicator in the service template, whether the service indicator filled by the user is proper. If the service indicator is proper, the management server may convert the service indicator to a corresponding storage resource capacity according to the conversion formula used for converting the service indicator to the resource capacity in the service template, and allocate a corresponding virtual pool to the user based on the storage resource capacity, the resource type required by the to-be-provisioned service, and the resource quality property required by the to-be-provisioned service. Certainly, the user may further apply, using an SLA, for a virtual pool resource required by the to-be-provisioned service.

According to the resource pool processing method provided in this embodiment of the present disclosure, when there is no SLA information matching the service template of the to-be-provisioned service on the management server, the management server determines whether the storage capability of the storage device associated with each currently existing virtual resource pool meets the resource information required by the to-be-provisioned service in the service template, if no storage capability of the storage device associated with each currently existing virtual resource pool meets the resource information required by the to-be-provisioned service in the service template, further determines whether the storage capability of the storage device that is not currently associated with any virtual pool meets the resource information required by the to-be-provisioned service in the service template, and if the storage capability of the storage device that is not currently associated with any virtual pool does not meet the resource information required by the to-be-provisioned service in the service template, creates the new storage device based on the first SLA information and the preset storage infrastructure in order to create a more targeted new storage device. In addition, the management server may create the new virtual pool or expand an existing virtual pool using the storage orchestration subsystem without a need to deploy a storage device and a virtual pool by an administrator in order to greatly improve deployment efficiency of a new virtual pool.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Figure 8:
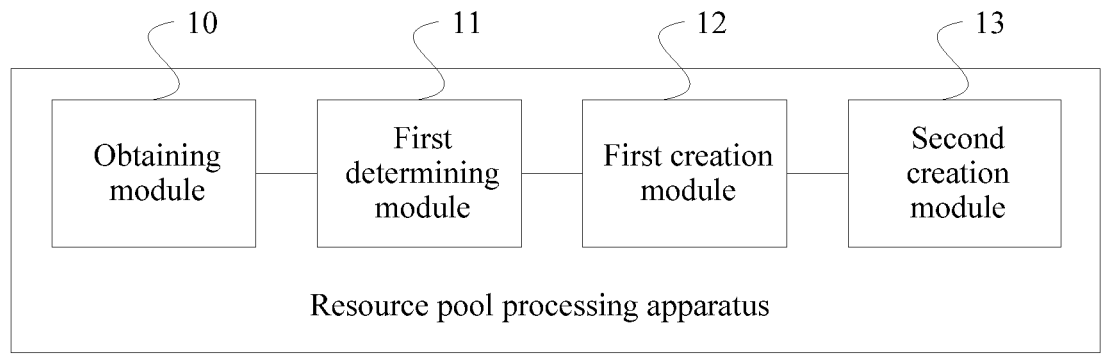
FIG. 8 is a schematic structural diagram of Embodiment 1 of a resource pool processing apparatus according to an embodiment of the present disclosure.

FIG. 8 is a schematic structural diagram of Embodiment 1 of a resource pool processing apparatus according to an embodiment of the present disclosure. The resource pool processing apparatus may include the resource allocation apparatus, and the processing apparatus may be implemented using software, hardware, or a combination of software and hardware. Optionally, the resource pool processing apparatus may be an independent management server. As shown in FIG. 8, the resource pool processing apparatus may include an obtaining module 10, a first determining module 11, a first creation module 12, and a second creation module 13.

The obtaining module 10 is configured to obtain a service template of a to-be-provisioned service, and determine, based on the service template, first SLA information corresponding to the to-be-provisioned service, where the first SLA information is used to represent a property of physical pool isolation between the to-be-provisioned service and an existing service, and resource information required by the to-be-provisioned service.

The first determining module 11 is configured to determine whether there is SLA information matching the service template on a management server.

The first creation module 12 is configured to, when the first determining module 11 determines that there is no SLA information matching the service template on the management server, create a new storage device based on the first SLA information and preset storage infrastructure.

The second creation module 13 is configured to create a new virtual resource pool based on the new storage device, and associate the new virtual resource pool with a new SLA.

The resource pool processing apparatus provided in this embodiment of the present disclosure may perform the foregoing method embodiments. An implementation principle and a technical effect thereof are similar to those of the method embodiments, and details are not described herein again.

Optionally, if the physical pool isolation property is physical pool isolated, the second creation module 13 is further configured to create the new virtual resource pool based on a physical pool on the new storage device, create the new SLA, and associate the new virtual resource pool with the new SLA, where the new virtual resource pool is independently corresponding to the physical pool on the new storage device.

Optionally, if the physical pool isolation property is non-physical pool isolated, the second creation module 13 is further configured to create the new virtual resource pool based on at least one physical pool on the new storage device and at least one physical pool on another existing storage device, create the new SLA, and associate the new virtual resource pool with the new SLA.

Figure 9:
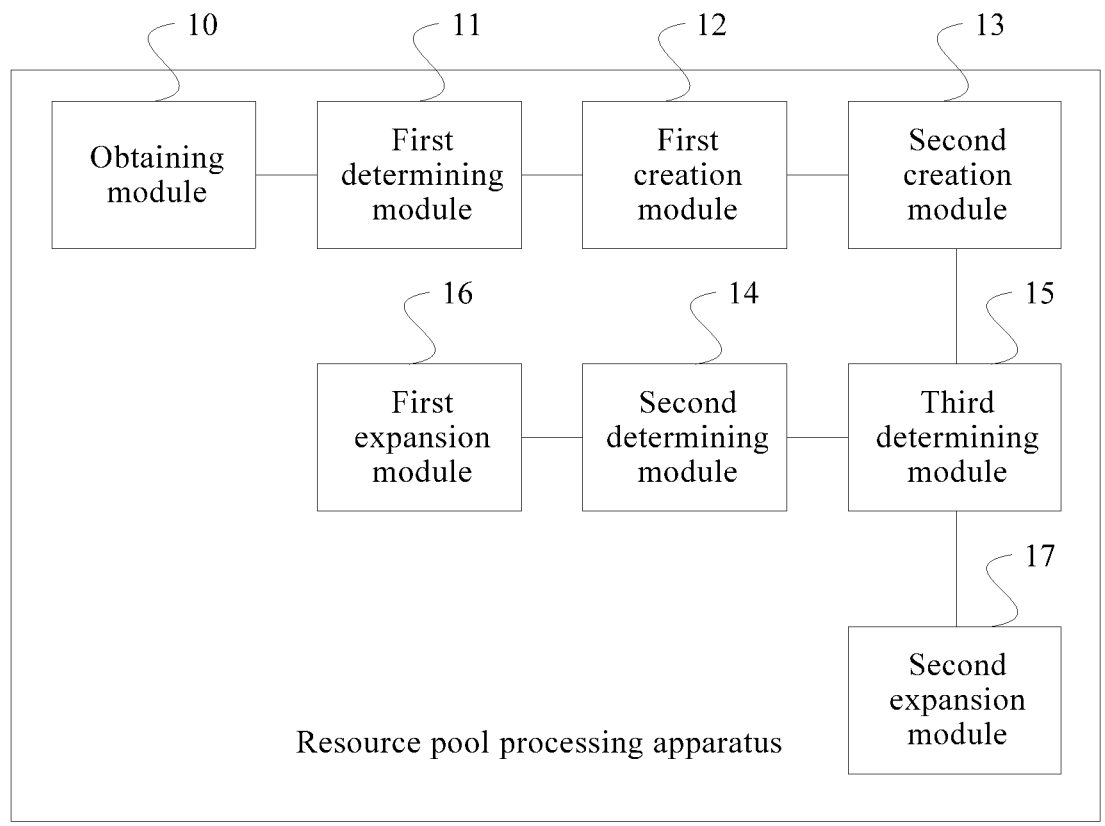
FIG. 9 is a schematic structural diagram of Embodiment 2 of a resource pool processing apparatus according to an embodiment of the present disclosure.

FIG. 9 is a schematic structural diagram of Embodiment 2 of a resource pool processing apparatus according to an embodiment of the present disclosure. Based on the embodiment shown in FIG. 8, further, the resource pool processing apparatus may further include a second determining module 14 and a third determining module 15. Optionally, the apparatus may further include a first expansion module 16 and a second expansion module 17.

Further, the second determining module 14 is configured to, before the first creation module 12 creates the new storage device based on the first SLA information and the preset storage infrastructure, determine whether a storage capability of a storage device associated with each currently existing virtual resource pool meets the resource information required by the to-be-provisioned service in the service template.

The third determining module 15 is configured to, when the second determining module 14 determines that no storage capability of the storage device associated with each currently existing virtual resource pool meets the resource information required by the to-be-provisioned service in the service template, determine whether a storage capability of a storage device that is not currently associated with any virtual pool meets the resource information required by the to-be-provisioned service in the service template.

The first creation module 12 is further configured to, when the third determining module 15 determines that the storage device that is not currently associated with any resource pool does not meet the resource information required by the to-be-provisioned service in the service template, create the new storage device based on the first SLA information and the preset storage infrastructure.

The first expansion module 16 is configured to, when the second determining module 14 determines that a capability of a first storage device associated with a currently existing first virtual resource pool meets the resource information required by the to-be-provisioned service in the service template, add an available physical pool on the first storage device to the first virtual resource pool, or expand storage space of a physical pool included in the first virtual resource pool.

The second expansion module 17 is configured to, when the third determining module 15 determines that a capability of a first storage device that is not currently associated with any resource pool meets the resource information required by the to-be-provisioned service in the service template, create the new virtual resource pool based on an available physical pool on the first storage device.

The resource pool processing apparatus provided in this embodiment of the present disclosure may perform the foregoing method embodiments. An implementation principle and a technical effect thereof are similar to those of the method embodiments, and details are not described herein again.

Further, the first SLA information includes a resource type required by the to-be-provisioned service, a resource capacity required by the to-be-provisioned service, and a resource quality property required by the to-be-provisioned service, and the resource quality property required by the to-be-provisioned service includes the property of physical pool isolation between the to-be-provisioned service and the existing service.

The first determining module 11 is further configured to determine whether a SLA information on the management server matches the resource type required by the to-be-provisioned service, the resource capacity required by the to-be-provisioned service, and the resource quality property required by the to-be-provisioned service, and if the SLA information on the management server matches the resource type required by the to-be-provisioned service, the resource capacity required by the to-be-provisioned service, and the resource quality property required by the to-be-provisioned service, determine that there is the SLA information matching the service template on the management server, or if the SLA information on the management server does not match the resource type required by the to-be-provisioned service, the resource capacity required by the to-be-provisioned service, or the resource quality property required by the to-be-provisioned service, determine that there is no SLA information matching the service template on the management server.

Optionally, the service template includes a conversion formula used for converting a service indicator to a resource capacity, a maximum value of the service indicator, the resource type required by the to-be-provisioned service, and the resource quality property required by the to-be-provisioned service.

The resource pool processing apparatus provided in this embodiment of the present disclosure may perform the foregoing method embodiments. An implementation principle and a technical effect thereof are similar to those of the method embodiments, and details are not described herein again.

Figure 10:
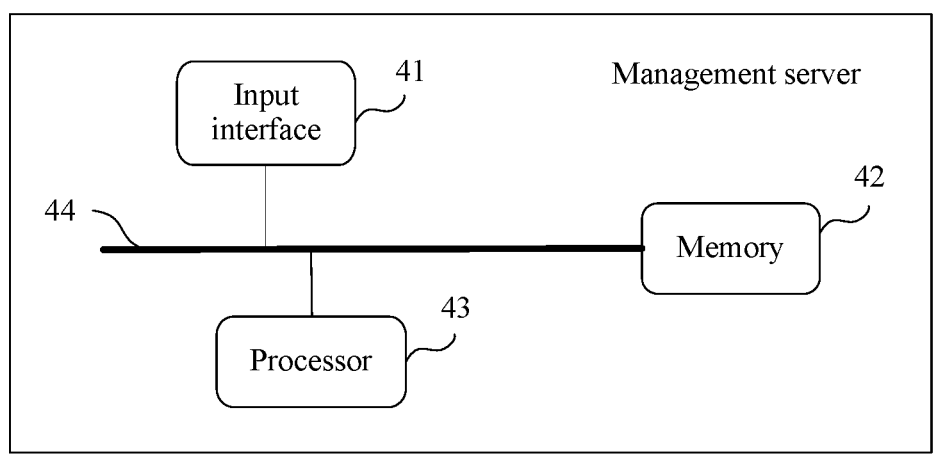
FIG. 10 is a schematic structural diagram of a management server according to an embodiment of the present disclosure.

FIG. 10 is a schematic structural diagram of a management server according to an embodiment of the present disclosure. As shown in FIG. 10, the management server may include an input interface 41, a memory 42, a processor 43, and at least one communications bus 44. The communications bus 44 is configured to implement a communication connection between components. The memory 42 may include a high-speed RAM, or may include a non-volatile memory (NVM), for example, at least one disk memory. The memory 42 may store various programs to complete various processing functions and implement method steps in this embodiment. In addition, the input interface 41 in this embodiment may be an interface for a user, or may be an input interface for a device, for example, an interface for the user to perform entering in a display interface of the management server, or a device interface for another device to enter data to the management server. The processor 43 may be, for example, a central processing unit (CPU), or may be a processing chip that has a service configuration command generation function and another function.

It should be noted that the communications bus 44 may be an industry standard architecture (ISA) bus, a peripheral component interconnect (PCI) bus, an extended ISA (EISA) bus, or the like. The communications bus 44 may be one or more physical lines. When the communications bus 44 is a plurality of physical lines, the communications bus 44 may be categorized into an address bus, a data bus, a control bus, and the like.

In this embodiment of the present disclosure, the input interface 41 is configured to obtain a service template of a to-be-provisioned service.

The processor 43 is configured to determine, based on the service template, first SLA information corresponding to the to-be-provisioned service, and determine whether there is SLA information matching the service template on a management server, and if there is no SLA information matching the service template on the management server, create a new storage device based on the first SLA information and preset storage infrastructure, create a new virtual resource pool based on the new storage device, and associate the new virtual resource pool with a new SLA.

The first SLA information is used to represent a property of physical pool isolation between the to-be-provisioned service and an existing service, and resource information required by the to-be-provisioned service.

The management server provided in this embodiment of the present disclosure may perform the foregoing method embodiments. An implementation principle and a technical effect thereof are similar to those of the method embodiments, and details are not described herein again.

Optionally, if the physical pool isolation property is physical pool isolated, the processor 43 is further configured to create the new virtual resource pool based on a physical pool on the new storage device, create the new SLA, and associate the new virtual resource pool with the new SLA, where the new virtual resource pool is independently corresponding to the physical pool on the new storage device.

Optionally, if the physical pool isolation property is non-physical pool isolated, the processor 43 is further configured to create the new virtual resource pool based on at least one physical pool on the new storage device and at least one physical pool on another existing storage device, create the new SLA, and associate the new virtual resource pool with the new SLA.

Further, the processor 43 is further configured to, before creating the new storage device based on the first SLA information and the preset storage infrastructure, determine whether a storage capability of a storage device associated with each currently existing virtual resource pool meets the resource information required by the to-be-provisioned service in the service template, if no storage capability of the storage device associated with each currently existing virtual resource pool meets the resource information required by the to-be-provisioned service in the service template, determine whether a storage capability of a storage device that is not currently associated with any virtual pool meets the resource information required by the to-be-provisioned service in the service template, and if the storage device that is not currently associated with any resource pool does not meet the resource information required by the to-be-provisioned service in the service template, create the new storage device based on the first SLA information and the preset storage infrastructure.

Further, the processor 43 is further configured to, when a capability of a first storage device associated with a currently existing first virtual resource pool meets the resource information required by the to-be-provisioned service in the service template, add an available physical pool on the first storage device to the first virtual resource pool, or expand storage space of a physical pool included in the first virtual resource pool.

Further, the processor 43 is further configured to, when a capability of a first storage device that is not currently associated with any resource pool meets the resource information required by the to-be-provisioned service in the service template, create the new virtual resource pool based on an available physical pool on the first storage device.

Optionally, the first SLA information includes a resource type required by the to-be-provisioned service, a resource capacity required by the to-be-provisioned service, and a resource quality property required by the to-be-provisioned service, and the resource quality property required by the to-be-provisioned service includes the property of physical pool isolation between the to-be-provisioned service and the existing service.

The processor 43 is further configured to determine whether a SLA information on the management server matches the resource type required by the to-be-provisioned service, the resource capacity required by the to-be-provisioned service, and the resource quality property required by the to-be-provisioned service, and if the SLA information on the management server matches the resource type required by the to-be-provisioned service, the resource capacity required by the to-be-provisioned service, and the resource quality property required by the to-be-provisioned service, determine that there is the SLA information matching the service template on the management server, or if the SLA information on the management server does not match the resource type required by the to-be-provisioned service, the resource capacity required by the to-be-provisioned service, or the resource quality property required by the to-be-provisioned service, determine that there is no SLA information matching the service template on the management server.

Optionally, the service template includes a conversion formula used for converting a service indicator to a resource capacity, a maximum value of the service indicator, the resource type required by the to-be-provisioned service, and the resource quality property required by the to-be-provisioned service.

The management server provided in this embodiment of the present disclosure may perform the foregoing method embodiments. An implementation principle and a technical effect thereof are similar to those of the method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A resource pool processing method, comprising:
obtaining a service template of a to-be-provisioned service at a management server comprising service-level agreement (SLA) information for a plurality of currently existing virtual resource pools;
determining, based on the service template, first SLA information corresponding to the to-be-provisioned service, wherein the first SLA information includes a service indicator of the to-be-provisioned service, and represents resource information required by the to-be-provisioned service and a property of physical pool isolation between the to-be-provisioned service and an existing service, wherein the resource information comprises a resource type, a resource capacity, and a resource quality property required by the to-be-provisioned service, wherein the service template includes a conversion formula and a maximum value of the service indicator, and wherein the conversion formula is used for converting the service indicator to the resource capacity in the resource information;
determining, based on a comparison between the service indicator and the maximum value of the service indicator, that the service indicator is proper;
determining, in response to the determination that service indicator is proper, that the management server does not comprise any SLA information of currently existing virtual resource pools that match the first SLA information;
determining, in response to the management server not comprising any SLA information that matches the first SLA information, that a storage capability of any storage devices that are not currently associated with any currently existing virtual resource pools do not meet the resource information required by the to-be-provisioned service in the service template;
creating, in response to the determination that no storage devices meet the resource information required by the to-be-provisioned service, a new storage device based on the first SLA information and preset storage infrastructure;
determining a first physical pool on the new storage device;
creating a new virtual resource pool based on the first physical pool on the new storage device and a second physical pool on an existing storage device; and
associating the new virtual resource pool with the first SLA information within the management server.

2. The resource pool processing method of claim 1, wherein the physical pool isolation property is physical pool isolated, and wherein the resource pool processing method further comprises:
creating the new virtual resource pool based on the physical pool on the new storage device, wherein only the new virtual resource pool occupies the physical pool on the new storage device;
creating the new SLA; and
associating the new virtual resource pool with the new SLA.

3. The resource pool processing method of claim 1, wherein the physical pool isolation property is non-physical pool isolated, and wherein the resource pool processing method further comprises:
creating the new SLA; and
associating the new virtual resource pool with the new SLA.

4. The resource pool processing method of claim 1, wherein a capability of a first storage device associated with a currently existing first virtual resource pool meets the resource information required by the to-be-provisioned service in the service template, and wherein the resource pool processing method further comprises adding an available physical pool on the first storage device to the first virtual resource pool.

5. The resource pool processing method of claim 1, wherein a capability of a first storage device associated with a currently existing first virtual resource pool meets the resource information required by the to-be-provisioned service in the service template, and wherein the resource pool processing method further comprises expanding storage space of a physical pool comprised in the first virtual resource pool.

6. The resource pool processing method of claim 1, wherein a capability of a first storage device that is not currently associated with any virtual resource pool meets the resource information required by the to-be-provisioned service in the service template, and wherein the resource pool processing method further comprises creating the new virtual resource pool based on an available physical pool on the first storage device.

7. The resource pool processing method of claim 1, wherein the resource quality property required by the to-be-provisioned service comprises the property of physical pool isolation between the to-be-provisioned service and the existing service, and wherein determining whether the management server comprises the SLA information matching the service template comprises:
determining whether SLA information on the management server matches the resource type required by the to-be-provisioned service, the resource capacity required by the to-be-provisioned service, and the resource quality property required by the to-be-provisioned service;
determining that the management server comprises the SLA information matching the service template when the SLA information on the management server matches the resource type required by the to-be-provisioned service, the resource capacity required by the to-be-provisioned service, and the resource quality property required by the to-be-provisioned service; and
determining that the management server does not comprise the SLA information matching the service template when the SLA information on the management server does not match the resource type required by the to-be-provisioned service, the resource capacity required by the to-be-provisioned service, or the resource quality property required by the to-be-provisioned service.

8. The resource pool processing method of claim 1, wherein the resource quality property further comprises a disk type required by the to-be-provisioned service.

9. The resource pool processing method of claim 1, wherein the resource quality property further comprises a raid level required by the to-be-provisioned service.

10. A management server comprising service-level agreement (SLA) information for a plurality of currently existing virtual resource pools, the management server comprising:
   an input interface configured to obtain a service template of a to-be-provisioned service; and
   a processor coupled to the input interface and configured to:
      determine, based on the service template, first SLA information corresponding to the to-be-provisioned service, wherein the first SLA information includes a service indicator of the to-be-provisioned service and represents resource information required by the to-be-provisioned service and a property of physical pool isolation between the to-be-provisioned service and an existing service, wherein the resource information comprises a resource type, a resource capacity, and a resource quality property required by the to-be-provisioned service, wherein the service template includes a conversion formula and a maximum value of the service indicator, and wherein the conversion formula is used for converting the service indicator to the resource capacity in the resource information;
      determine, based on a comparison between the service indicator and the maximum value of the service indicator, whether the service indicator is proper;
      determine, when the service indicator is proper, whether the management server comprises SLA information of each currently existing virtual resource pool matches the service template;
      create a new storage device based on the first SLA information and preset storage infrastructure when the management server does not comprise the SLA information matching the service template and a storage capability of any storage devices that are not currently associated with any currently existing virtual resource pools do not meet the resource information required by the to-be-provisioned service in the service template;
      determine a first physical pool on the new storage device;
      create a new virtual resource pool based on the first physical pool on the new storage device and a second physical pool on an existing storage device; and
      associate the new virtual resource pool with the first SLA information, wherein the first SLA information represents the resource information required by the to-be-provisioned service and a property of physical pool isolation between the to-be-provisioned service and an existing service.

11. The management server of claim 10, wherein the physical pool isolation property is physical pool isolated, and wherein the processor is further configured to:
   create the new virtual resource pool based on the physical pool on the new storage device;
   create the new SLA; and
   associate the new virtual resource pool with the new SLA, wherein only the new virtual resource pool occupies the physical pool on the new storage device.

12. The management server of claim 10, wherein the physical pool isolation property is non-physical pool isolated, and wherein the processor is further configured to:
   create the new SLA; and
   associate the new virtual resource pool with the new SLA.

13. The management server of claim 10, wherein a capability of a first storage device associated with a currently existing first virtual resource pool meets the resource information required by the to-be-provisioned service in the service template, and wherein the processor is further configured to add an available physical pool on the first storage device to the first virtual resource pool.

14. The management server of claim 10, wherein a capability of a first storage device associated with a currently existing first virtual resource pool meets the resource information required by the to-be-provisioned service in the service template, and wherein the processor is further configured to expand storage space of a physical pool comprised in the first virtual resource pool.

15. The management server of claim 10, wherein a capability of a first storage device that is not currently associated with any virtual resource pool meets the resource information required by the to-be-provisioned service in the service template, and wherein the processor is further configured to create the new virtual resource pool based on an available physical pool on the first storage device.

16. The management server of claim 10, wherein the resource quality property required by the to-be-provisioned service comprises the property of physical pool isolation between the to-be-provisioned service and the existing service, and wherein the processor is further configured to:
   determine whether SLA information on the management server matches the resource type required by the to-be-provisioned service, the resource capacity required by the to-be-provisioned service, and the resource quality property required by the to-be-provisioned service;
   determine that the management server comprises the SLA information matching the service template when the SLA information on the management server matches the resource type required by the to-be-provisioned service, the resource capacity required by the to-be-provisioned service, and the resource quality property required by the to-be-provisioned service; and
   determine that the management server does not comprise the SLA information matching the service template when the SLA information on the management server does not match the resource type required by the to-be-provisioned service.

17. The management server of claim 10, wherein the first SLA information comprises a resource type required by the to-be-provisioned service, a resource capacity required by the to-be-provisioned service, and a resource quality property required by the to-be-provisioned service, wherein the resource quality property required by the to-be-provisioned service comprises the property of physical pool isolation between the to-be-provisioned service and the existing service, and wherein the processor is further configured to:
   determine whether SLA information on the management server matches the resource type required by the to-be-provisioned service, the resource capacity required by the to-be-provisioned service, and the resource quality property required by the to-be-provisioned service;
   determine that the management server comprises the SLA information matching the service template when the SLA information on the management server matches the resource type required by the to-be-provisioned service, the resource capacity required by the to-be-provisioned service, and the resource quality property required by the to-be-provisioned service; and
   determine that the management server does not comprise the SLA information matching the service template when the SLA information on the management server does not match the resource capacity required by the to-be-provisioned service.

18. The management server of claim 10, wherein the first SLA information comprises a resource type required by the to-be-provisioned service, a resource capacity required by the to-be-provisioned service, and a resource quality property required by the to-be-provisioned service, wherein the resource quality property required by the to-be-provisioned service comprises the property of physical pool isolation between the to-be-provisioned service and the existing service, and wherein the processor is further configured to:
- determine whether SLA information on the management server matches the resource type required by the to-be-provisioned service, the resource capacity required by the to-be-provisioned service, and the resource quality property required by the to-be-provisioned service;
- determine that the management server comprises the SLA information matching the service template when the SLA information on the management server matches the resource type required by the to-be-provisioned service, the resource capacity required by the to-be-provisioned service, and the resource quality property required by the to-be-provisioned service; and
- determine that the management server does not comprise the SLA information matching the service template when the SLA information on the management server does not match the resource quality property required by the to-be-provisioned service.

19. The management server of claim 18, wherein the resource quality property further comprises a disk type required by the to-be-provisioned service.

20. The management server of claim 18, wherein the resource quality property further comprises a raid level required by the to-be-provisioned service.

* * * * *

UNITED STATES PATENT AND TRADEMARK OFFICE
CERTIFICATE OF CORRECTION

PATENT NO. : 11,301,303 B2
APPLICATION NO. : 16/287502
DATED : April 12, 2022
INVENTOR(S) : Songtao Li It is certified that error appears in the above-identified patent and that said Letters Patent is hereby corrected as shown below:

On the Title Page

Page 2, (56) References Cited, U.S. Patent Documents: "8,898,402 B1 11/2014 Strange" should read "8,898,402 B1 11/2014 Stronge"

In the Claims

Claim 10, Column 25, Lines 11-12: "service and represents" should read "service, and represents"

Signed and Sealed this
Twenty-second Day of November, 2022

Katherine Kelly Vidal
*Director of the United States Patent and Trademark Office*